United States Patent [19]

Kataoka

[11] Patent Number: 4,752,204
[45] Date of Patent: Jun. 21, 1988

[54] APPARATUS FOR COMPRESSION FORMING THERMOPLASTIC RESIN SHEETS

[75] Inventor: Hiroshi Kataoka, Tokyo, Japan

[73] Assignee: Asahi Kasei Kogyo Kabushiki Kaisha, Japan

[21] Appl. No.: 873,528

[22] Filed: Jun. 12, 1986

Related U.S. Application Data

[62] Division of Ser. No. 763,623, Aug. 8, 1985, abandoned, which is a division of Ser. No. 480,350, Mar. 30, 1983, Pat. No. 4,500,057.

[30] Foreign Application Priority Data

Apr. 1, 1982 [JP] Japan .................................. 57-52283

[51] Int. Cl.⁴ ............................................. B29C 35/00
[52] U.S. Cl. ..................................... 425/384; 219/243; 264/294; 264/327; 425/394; 425/407
[58] Field of Search ............... 264/1.6, 2.7, 130, 210.5, 264/211, 291, 292, 293, 294, 320, 322, 327, 40.5; 425/144, 143, 193, 195, 383, 384, 394, 395, 406, 407, 408, 424, 446, 450.1, 451.2, 451.9, 454; 219/243; 100/92, 93 P, 93 R

[56] References Cited

U.S. PATENT DOCUMENTS

| | | | |
|---|---|---|---|
| 2,532,501 | 12/1950 | Johnson | 425/144 |
| 3,671,624 | 6/1972 | Antalek | 264/320 |
| 4,465,448 | 8/1984 | Aldridge | 425/129 S |

FOREIGN PATENT DOCUMENTS 52-26579  2/1977  Japan .............................. 156/583.1

Primary Examiner—Jay H. Woo
Assistant Examiner—J. Fortenberry
Attorney, Agent, or Firm—Finnegan, Henderson, Farabow, Garrett & Dunner

[57] ABSTRACT

A compression forming apparatus for forming a thermoplastic resin sheet is disclosed wherein a thermoplastic resin blank is compressed between a pair of heated mold plates, the mold plates are cooled to solidify the thus-formed sheet, and the sheet is taken out from the mold plates. This compression forming apparatus has a clamping device, a pair of cooling die plates, a pair of mold plates which are attached to the cooling die plates, means for heating the mold plates, and springs or actuators enabling the mold plates to be held in contact with the cooling die plates when the mold plates are clamped and held in non-contact with the cooling die plates when the mold plates are opened.

2 Claims, 9 Drawing Sheets

APPARATUS FOR COMPRESSION FORMING THERMOPLASTIC RESIN SHEETS

This is a division of application Ser. No. 763,623, filed Aug. 8, 1985, now abandoned which is a division of Application Ser. No. 480,350, filed Mar. 30, 1983, now U.S. Pat. No. 4,500,057.

BACKGROUND OF THE INVENTION (1) Field of the Invention

The present invention relates to a tough acrylic sheet suitable for a glazing material and also to a compression forming method and apparatus for the production thereof.

(2) Description of the Prior Art

Acrylic sheets having a thickness of 1 to 10 mm, which are generally used at the present, are formed by extrusion molding of polymethyl methacrylate (hereinafter referred to as "PMMA") or by cell casting of methyl methacrylate (hereinafter referred to as "MMA"). These acrylic sheets are ordinarily excellent in the transparency, weatherability, hardness, and rigidity and are used as glazing materials for vehicles or buildings. However, they are poor in resistance to shock. Accordingly, development of acrylic sheets having an improved impact or shock resistance while retaining good weatherability, hardness and rigidity has been desired. A product obtained by copolymerizing an acrylic resin with a rubber component has been proposed as an acrylic sheet having an improved impact resistance. However, the copolymerization with a rubber component results in the reduction of the weatherability, hardness, and rigidity. Furthermore, biaxial orientation of an acrylic resin has been proposed. However, no satisfactory results can be obtained according to this proposal. Biaxially oriented PMMA sheets having a thickness of 1 to 10 mm, which have heretofore been marketed, are manufactured according to the stretching method disclosed, for example, in U.S. Pat. No. Re. 24,978. Biaxially oriented sheets according to the stretching method are ordinarily formed in the lowly viscous state, and therefore, the degree of the biaxial orientation is low and the orientation release stress (hereinafter referred to as "ORS") is small. Accordingly, an acrylic sheet having a sufficient toughness has not been provided according to the stretching method.

The properties of biaxially oriented PMMA sheets are described in detail in Kunststoff-Handbuch, Band IX, Polymethacrylate, pages 125-134 (Carl Hanser Verlag, Munchen, 1975). In this known literature reference, it is taught that the breaking energy of a biaxially oriented PMMA sheet is the greatest when the stretch ratio is 3, but if the stretch ratio exceeds 3, the breaking energy is reduced. Accordingly, it may be said that the stretch ratio of 3 is preferred in the industrial production. In fact, in commercially available biaxially oriented PMMA sheets, the stretch ratio is about 3.

In the conventional compression forming apparatus, a mold defining a mold cavity and a die plate of a clamping device are integrated with each other. When the mold is heated and cooled at one step in the compression forming process, the die plate is also heated and cooled. Accordingly, the time required for the completion of one step is long and the energy consumption is large.

U.S. Pat. No. 3,632,841 discloses a compression forming method in which an acrylic resin is biaxially oriented with the use of a lubricant. In this method, the compression pressure is relatively low and in the range of from 300 to 600 psi (21 to 42 kg/cm$^2$). Accordingly, the stretching rate is low, and the stretch ratio is low and less than 3. When ORS indicating the degree of orientation was measured by us, it was found that the ORS of the sheet formed according to this known method was approximately 5 to 15 kg/cm$^2$. Thus, it was confirmed that the degree of orientation in this acrylic sheet is low and the acrylic sheet exhibits a poor toughness. If the compression pressure is increased in the method of the above U.S. patent, the frictional force between the acrylic resin and the mold is increased proportionally to the compression pressure, and the lubricating property is undesirably degraded. In order to prevent the formation of cracks, in U.S. Pat. No. 3,632,841, it is specified that compression should be performed under a low compression pressure and molding should be carried out at a low stretching rate.

As is apparent from the foregoing description, a biaxially oriented PMMA sheet having a high degree of orientation, which is formed under a high compression pressure, has not been reported.

Japanese Unexamined Patent Publication (Kokai) No. 56-30809 discloses a biaxially oriented acrylic sheet having a thickness of at least 1 mm, which is formed by compression forming. This acrylic sheet is obtained by applying a lubricant to a synthetic resin plate blank having a thickness of at least 5 mm, preheating the blank at a temperature between the glass transition temperature and the melting point of the blank, placing the blank in a compression mold heated at a temperature of at least the glass transition temperature of the blank and compressing the blank to biaxially orient the blank. According to this method, however, it is impossible to sufficiently improve the impact resistance without degradation of the characteristic properties of PMMA. The resin blank used in the method disclosed in the above Japanese patent publication is prepared by extrusion molding, compression molding or injection molding, and therefore, the molecular weight of the resin is low. Namely, the resin blank-constituting polymer is not an ultra-high-molecular-weight polymer. In this sheet, as the molecular weight is high, the sheet is more readily oriented, and a high toughness cannot be attained. In any of the compression forming methods taught in the above-mentioned two references, it is impossible to carry out compression forming economically advantageously.

Means for heating and cooling dies are disclosed, for example, in U.S. Pat. No. 3,632,841. For example, the provision of holes on a die, through which heating steam and cooling water are circulated to heat and cool the die is shown. A long time and a large quantity of energy are necessary for heating or cooling a metal die having a considerable thickness. Furthermore, if heating or cooling holes are formed in the vicinity of the surface of the mold so as to promptly heat or cool the mold, the heating or cooling of the surface of the mold becomes uneven, resulting in the production of a non-uniform acrylic sheet. In the molding of a biaxially oriented sheet, the uniformity of the temperature over the entire surface of the mold is important. When the mold is cooled, this temperature uniformity is especially important. In order to uniformly cool the surface of the mold, it is necessary to form a cooling water hole at a point considerably apart from the surface of the mold. If a hole for heating steam or cooling water is formed at such a distant point, a large quantity of energy and a long time are required for heating or cooling.

SUMMARY OF THE INVENTION

It is therefore the primary object of the present invention to provide an acrylic sheet having an improved impact resistance of a level at least 10 times as high as the impact resistance of the conventional acrylic sheets while retaining merits of PMMA such as excellent weatherability, hardness, rigidity and transparency.

Another object of the present invention is to provide a compression sheet-forming method for acrylic resins, in which an acrylic resin can be biaxially oriented at such a high ratio is not attainable in the known biaxially stretching methods and various economical advantages such as shortening of the sheet-forming time and attainment of the energy-saving effect and technical advantages such as smoothness of the surface of a formed sheet and uniform biaxial orientation can be attained.

Still another object of the present invention is to provide a sheet having a surface smoothness and being excellent in the weatherability, hardness, rigidity and transparency and especially in impact resistance, which is suitable as a glazing material for windows of vehicles and buildings such as sun rooms, gymnasia and public facilities, roofs and shelters, and to provide a glazing material formed from this sheet.

In accordance with one fundamental aspect of the present invention, there is provided a tough acrylic sheet having a smooth surface and a thickness of 1 to 10 mm, which is composed of an ultra-high-molecular-weight methyl methacrylate polymer having a weight average molecular weight of at least 1,000,000 and being biaxially oriented at an area stretch ratio of at least 3, preferably from 4 to 10, and has a maximum orientation release stress of at least 20 kg/cm$^2$.

In accordance with another fundamental aspect of the present invention, there is provided a method for the compression forming of acrylic sheets, which comprises heating mold plates, clamping the mold plates containing an acrylic resin material therein to shape the acrylic resin material into a sheet form, cooling the mold plates to cool and solidify the acrylic resin material between the mold and taking out the formed acrylic sheet from the mold plates, wherein at the step of heating the mold plates, the mold plates are held substantially in non-contact with cooling die plates of a clamping device and at the clamping and cooling steps, the mold plates are held in contact with the cooling die plates of the clamping device.

In accordance with still another aspect of the present invention, there is provided a compression forming method for the production of biaxially oriented acrylic resin sheets, which comprises heating a thick acrylic resin blank having a surface area of at least 400 cm$^2$ and being composed of an ultra-high-molecular weight methyl methacrylate polymer having a weight average molecular weight of at least 1,000,000 at a temperature higher than the glass transition temperature of the resin but lower than the melting point of the resin so that the ratio of the viscosity of the resin of the surface layer portion to the viscosity of the resin of the core portion is smaller than 0.8, placing the heated resin blank in a flat clamping mold heated to the temperature of the surface layer portion of the resin blank or a temperature close thereto, applying a high compressive force of at least 45 kg, preferably at least 150 kg, per cm$^2$ of the resin blank in the state where a film of a lubricant is present between the resin blank and the clamping mold, to thereby stretch the resin blank biaxially, cooling the mold to cool and solidify the biaxially stretched product, and taking out the product from the mold, whereby a tough acrylic sheet having a smooth surface and a thickness of 1 to 10 mm, which is biaxially oriented at an area stretch ratio of at least 3 and has a maximum orientation release stress of at least 20 kg/cm$^2$, is obtained.

In accordance with a further aspect of the present invention, there is provided a compression forming apparatus for forming a synthetic resin sheet of the type wherein a synthetic resin blank is compressed between a pair of heated mold plates, the mold plates are cooled to solidify the formed sheet, and the sheet is taken out from the mold plates, said apparatus comprising a clamping device, a pair of cooling dieplates, a heating device and springs or actuators which are arranged so that the mold plates are held in non-contact with the cooling die plates when the mold plates are opened and the mold plates are held in contact with the cooling die plates when the mold plates are clamped.

DESCRIPTION OF THE PREFERRED EMBODIMENTS

Figure 1:
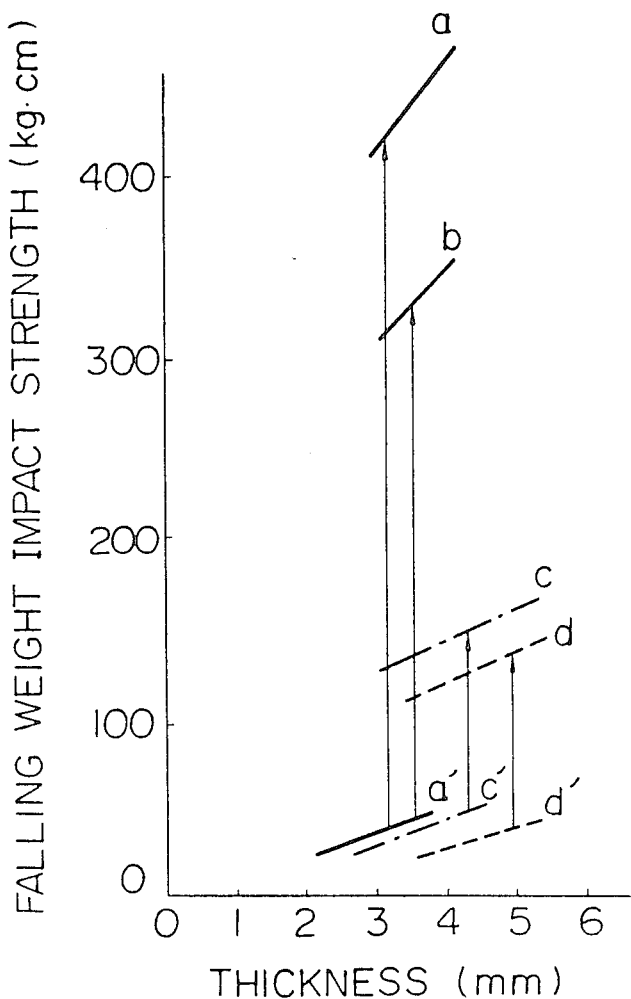
FIG. 1 is a graph showing the falling weight impact strength of a biaxially oriented PMMA sheet formed according to the method of the present invention.

The acrylic resin or PMMA referred to in the present invention is a polymer composed mainly of methyl methacrylate (hereinafter referred to as "MMA" for brevity). In the present invention, a homopolymer of MMA and a copolymer having an MMA content of at least 98% by weight, especially at least 99% by weight, is preferably used. A homopolymer of MMA is most preferred.

When MMA is copolymerized with another comonomer, the glass transition temperature is lowered depending upon the amount of the comonomer. In a biaxially oriented sheet, abrupt shrinkage takes place at a temperature slightly lower than the glass transition temperature. It is ordinarily required that a glazing material have a heat resistance to temperatures of up to about 90° C., and therefore, it is required that a biaxially oriented sheet to be used as a glazing material not shrink at temperatures of up to 90° C. Accordingly, it is preferred that the amount of the comonomer copolymerized with MMA be smaller.

A copolymer of MMA has a good moldability but this copolymer is inferior to a homopolymer of MMA in the weatherability, hardness, and rigidity. Also from this viewpoint, a homopolymer of MMA is preferred. As the copolymer, an MMA/styrene/maleic anhydride terpolymer can be used as heat-resistant PMMA.

It is also desirable that the amounts of an ultraviolet absorber, a dye, a pigment and other additives incorporated be small.

In order to attain a biaxially orienting effect sufficiently by sufficient entanglement of polymer chains, it is indispensable that the weight average molecular weight of PMMA used in the present invention be at least 1,000,000, preferably from 1,000,000 to 10,000,000. The polymer may contain a small amount of a cross-linked gel portion. In this polymer, the molecular weight is that of a non-gelled portion of the polymer. A thick blank of this ultra-high-molecular-weight PMMA can easily be prepared according to the cell cast method.

The sheet of the present invention is a tough sheet which is biaxially oriented in the highly viscous state at an area stretch ratio of at least 3, preferably 4 to 10, and has a maximum ORS of at least 20 kg/cm$^2$, preferably 25 to 40 kg/cm$^2$. It is preferred that the biaxially oriented sheet of the present invention have substantially the same ORS in the two stretching directions perpendicular to each other. However, a biaxially oriented sheet in which there is a certain difference of ORS between the two orientation directions is included in the biaxially oriented sheet of the present invention. In short, a biaxially oriented sheet in which the ORS ratio between the two orientation directions is about 1 to about 1.5 is included in the scope of the present invention. In the case where there is a difference of ORS between the two orientation directions, the maximum ORS in the lower ORS orientation direction should be at least 20 kg/cm$^2$.

The term "stretch ratio" referred to in the present invention means a stretch ratio expressed by the area ratio or thickness ratio, and it is defined that the stretch ratio and the compression ratio have the same meaning.

Figure 6:
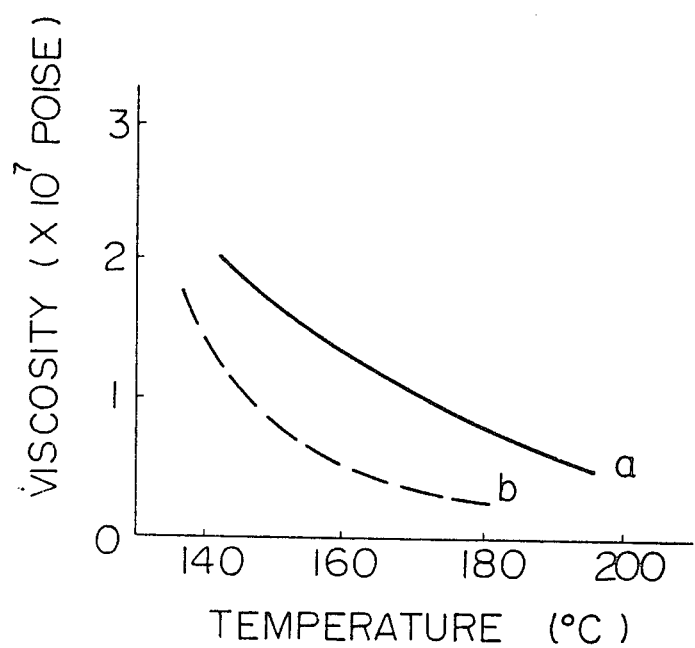
FIG. 6 is a graph illustrating the relation between the temperature and viscosity of PMMA.

The term "highly viscous state" means a state in which the viscosity is much higher than the viscosity attained at the stretching step in the stretch sheet-forming process and the viscosity is preferably at least $1 \times 10^7$ poise and especially preferably at least $1.5 \times 10^7$ poise. The relation between the temperature and viscosity of PMMA is illustrated in FIG. 6, which is determined by performing the measurement by using a Dynamic Spectrometer (Model RDS-7700 supplied by Rheometrics, Inc.) under conditions of a shear rate of 0.1 radian/sec and a strain of 1%. In FIG. 6, curves a and b signify PMMA of a molecular weight of 4,400,000 and PMMA of a molecular weight of 160,000, respectively.

As a matter of course, the higher the molecular weight, the higher the viscosity at a certain temperature. In the present invention, a highly viscous state in which the viscosity is at least $1 \times 10^7$ poise, especially at least $1.5 \times 10^7$ poise, is preferred. The viscosity referred to herein is the average viscosity of the PMMA blank.

The thickness of the biaxially oriented acrylic sheet of the present invention is 1 to 10 mm, preferably 2 to 8 mm. It is difficult to prepare a biaxially oriented acrylic sheet having a thickness smaller than 1 mm or larger than 10 mm according to the compression forming. When a biaxially oriented acrylic sheet is formed by the compression forming, as the thickness of the sheet is reduced, a larger compressive force becomes necessary. A very high compressive force is necessary for forming a biaxially oriented acrylic sheet having a thickness smaller than 1 mm. On the other hand, stable forming of a biaxially oriented acrylic sheet having a thickness larger than 10 mm is difficult. In view of the facility of the sheet-forming operation and also in view of the fact that the sheet is used as a glazing material, it is preferred in the present invention that the thickness of the biaxially oriented acrylic sheet be 2 to 8 mm.

The acrylic sheet of the present invention includes not only a planar sheet but also a sheet having a gently curved surface, for example, a sheet having a convex surface used for, for example, a canopy.

The acrylic sheet may be used as a part of a multilayer sheet. For example, the sheet of the present invention may be used as one layer of a two-layer sheet or as a front or back layer of a three-layer sheet.

As examples of the resin preferably laminated with the acrylic sheet of the present invention, a polycarbonate and a styrene/acrylonitrile copolymer can be mentioned. An aromatic polycarbonate derived from bisphenol A has a good adhesion to PMMA and it can conveniently be press-bonded to PMMA when the polycarbonate is in the molten state. A three-layer laminate structure comprising the acrylic sheet of the present invention as the front and back layers and the polycarbonate as the inner core layer has especially good properties. Namely, this structure retains excellent properties inherent to PMMA, such as excellent weatherability, hardness and rigidity, and has an excellent impact strength. Furthermore, this sheet structure is not scattered when it is broken under shock. Accordingly, this multi-layer laminate sheet is excellent as a safe glazing material.

The acrylic sheet of the present invention is advantageously formed by a compression forming method comprising heating mold plates, clamping the mold plates containing an acrylic resin material therein, shaping the acrylic resin material into a sheet form, cooling the mold plates to cool and solidify the acrylic resin material between the mold plates and taking out the formed acrylic sheet from the mold plates, wherein at the step of heating the mold plates, the mold plates are held substantially in non-contact with cooling die plates of a clamping device and at the clamping and cooling steps, the mold plates are held in contact with the cooling die plates of the clamping device.

A most preferred molding method is a compression forming method for the production of biaxially oriented acrylic resin sheets, which comprises heating a thick resin blank having a surface area of at least 400 cm$^2$ and being composed of an ultra-high-molecular-weight methyl methacrylate polymer having a weight average molecular weight of at least 1,000,000 at a temperature higher than the glass transition temperature of the resin but lower than the melting point of the resin so that the ratio of the viscosity of the resin of the surface layer portion to the viscosity of the resin of the core portion is smaller than 0.8, placing the heated resin blank in a flat clamping mold heated to the temperature of the surface layer portion of the resin blank or a temperature close thereto, that is, a temperature of (the temperature of the surface layer portion of the resin blank) ±20° C., applying a high compressive force of at least 45 kg per cm$^2$ of the resin blank in the state where a film of a lubricant having such a property as not causing breakage of the lubricant film is present in the interface between the resin blanak and the clamping mold, to thereby stretch the resin blank biaxially, cooling the mold to cool and solidify the biaxially stretched product, and taking out the product from the mold.

In this sheet-forming method, in order to attain uniform biaxial orientation, it is necessary to produce a so-called plug flow in which both the surface layer portion and the core portion of the resin blank flow at substantially the same speed during the compression. The flowing speed of the surface layer portion tends to decrease because of the friction with the surface of the mold. Especially when the compression is carried out at a very high compressive force as in the present invention for attaining a high degree of biaxial orientation, the friction of the surface layer portion of the resin blank with the surface of the mold is increased in proportion to the compressive force, and hence, it is very difficult to produce a plug flow. In the present invention, in order to avoid this disadvantage and produce a plug flow conveniently, a temperature difference is brought about between the surface layer portion and core portion of the resin blank so that the ratio of the viscosity of the acrylic resin in the surface layer portion to the viscosity of the resin in the core portion is smaller than 0.8, preferably in the range of from 0.7 to 0.3, whereby the flowability of the surface layer portion is increased.

The "temperature of the resin in the surface layer portion" means the temperature of the surface of the resin blank, and by the "temperature of the resin in the core portion" is meant the temperature of the resin blank at the center in the thickness direction.

In order to further improve the flowability of the surface layer portion of the resin blank, it is necessary to uniformly apply a good lubricant. A mixture of a lubricant and an extreme pressure additive or surfactant can be used as the good lubricant. Namely, a lubricant having a property such that a lubricant film is not broken even under a high compressive force is applied. An especially preferable lubricant comprises 50 to 95 parts by weight of polydimethylsiloxane having a number average molecular weight of at least 10,000, preferably 20,000 to 100,000, and 50 to 5 parts by weight of an oiling agent and/or a high pressure additive. Reasons why especially good results can be obtained by the use of this combination lubricant have not completely been elucidated, but it is believed that the oiling agent and/or the extreme pressure additive is stably present on the die surface because of a good affinity with the die and prevents breakage of the lubricant film even under a high compressive force or a high frictional force and that the polydimethylsiloxane having a high molecular weight and a high viscosity maintains a thickness exceeding a certain level for the lubricant film to exert good lubricating properties. When a high compressive force is applied, if the lubricant is pressed away to reduce the thickness of the lubricant film or break the lubricant film, this results in defective molding. The good lubricant described above is used for preventing this defective molding.

The polydimethylsiloxane includes not only a homopolymer of dimethyl siloxane but also a copolymer of dimethyl siloxane with a small amount of a comonomer, that is, modified polydimethylsiloxane, for example, epoxy-modified, alkyl-modified, amino-modified, alcohol-modified, fluorine-modified, polyether-modified or carboxyl-modified polydimethylsiloxane.

If the molecular weight of the polydimethylsiloxane is lower than 10,000, the lubricant is readily pressed away under a high compressive force to reduce the thickness of the lubricant film. Polydimethylsiloxane having a molecular weight of higher than 100,000 is difficult to prepare.

A long-chain compound having a polar group, such as a higher alcohol, a ketone, an ester, an amine, a higher fatty acid, a metal soap, an oil or a fat, can be used as the oiling agent. The main function of the oiling agent is to reduce the friction. More specifically, the oiling agent forms an adsorption film on the inner surface of the die by physical or chemical adsorption to prevent breakage of the lubricant film.

A compound containing chlorine, sulfur, phosphorus or the like is used as the high pressure additive. The extreme pressure additive forms a film by the chemical reaction with the inner surface of the die to lubricate the interface. An alkyl ester of phosphoric acid is especially preferably used.

If the ratio of the amount of the oiling agent and/or the extreme pressure additive to the amount of the polydimethylsiloxane is too low, the lubricant film is likely to break. In contrast, if the above ratio is too high, the lubricating action is degraded.

If the inner surface of the die is coarsened, prevention of breakage of the lubricant film can be attained. If the above-mentioned good lubricant is applied to this coarsened surface, this effect is further enhanced. It is believed that if this coarsened surface is formed, the lubricant can be prevented from being peeled off at one time over a broad region, and breakage of the lubricant film is effectively prevented. It is preferred that the surface roughness of the inner surface be in the range of about 5 to about 50 μm, especially 10 to 30 μm.

In order to highly orient the resin blank, it is necessary to apply a high compressive force, that is, a compressive force of at least 45 kg, preferably 150 to 700 kg, per cm$^2$ of the resin blank. The larger the compressive force, the higher the flow speed of the resin blank. When the resin blank is compressed and biaxially oriented, the larger the size of the resin blank and the larger the compressive force, the higher the flow speed in the lateral direction. The surface area of the resin blank used in the present invention is at least 400 cm$^2$. When a high compressive force of at least 150 kg/cm$^2$ is applied to a thick blank having a surface area of at least 400 cm$^2$, the flow speed in the lateral direction is high and ordinarily 3.1 cm/sec or higher. If a good lubricant as mentioned above is used and an appropriate coarse surface is given to the mold and if an appropriate temperature distribution is produced in the resin blank, compression sheet-forming can be accomplished more advantageously at such a high flow speed as mentioned above.

The biaxially oriented PMMA sheet prepared according to the above-mentioned sheet-forming method shrinks at a temperature close to the glass transition temperature (hereinafter referred to as "Tg") of PMMA. In order to elevate the shrinkage-initiating temperature, it is preferred that the sheet be subjected to a heat treatment, i.e., aging treatment.

The Tg of a homopolymer of MMA is 105° C. Although the temperature at which the main chain of PMMA begins to move is 105° C., the side chains begin to move at a lower temperature. Accordingly, the biaxially oriented sheet begins to shrink at a temperature lower than the Tg. When the biaxially oriented sheet obtained according to the method of the present invention is aged at a temperature not higher than Tg, preferably a temperature of from (Tg -15° C.) to Tg for at least 2 hours, preferably 4 to 72 hours, the orientation in the side chains is released and the shrinkage-initiating temperature can be elevated. It is preferred that the aging treatment be carried out under a compressive force or while fixing the end portions of the sheet. Especially when the aging treatment is carried out at a temperature close to Tg, in order to prevent the occurrence of extreme shrinkage, it is preferred that at the aging treatment, a compressive force be applied and the end portions of the sheet be fixed. From the industrial viewpoint, it is practically advantageous to elevate the shrinkage-initiating temperature and thus improve the heat resistance.

With reference to FIG. 1, the influence of the molecular weight of PMMA on the impact strength will now be described.

Thick PMMA blanks differing in the molecular weight are heated at 130° to 160° C. so that the ratio of the viscosity of the resin in the surface layer portion to the viscosity of the resin in the core portion is 0.5 to 0.6, and the blanks are placed in compression molds having appropriate coarse surfaces, which are heated at 160° C. and to which a good lubricant is applied. Each blank is compressed under a compressive force of 500 kg per cm² of the blank and uniformly oriented biaxially at a stretch area ratio of 5. A missile having a radius of ¾ inch is let to fall on the center of the molded sheet fixed to a circular frame having a diameter of 5 inches, from a height of 1 m and the sheet-breaking energy is measured. The obtained results are shown in FIG. 1, wherein the seven lines signify the following PMMA sheets.

| Line | Orientation | Weight average molecular weight ($\times 10^4$) |
|---|---|---|
| a | Biaxially oriented | 440 |
| b | Biaxially oriented | 260 |
| c | Biaxially oriented | 95 |
| d | Biaxially oriented | 16 |
| a' | Not oriented | 440, 260 |
| c' | Not oriented | 95 |
| d' | Not oriented | 16 |

It is seen that the higher the molecular weight, the higher the impact strength of PMMA, and that when PMMA having a weight average molecular weight of 4,400,000 is biaxially oriented at a stretch area ratio of 5 in the highly viscous state, the falling weight impact strength of the oriented sheet is about 20 times as high as that of unoriented PMMA. If the weight average molecular weight of PMMA exceeds 1,000,000, the effect of improving the falling weight impact strength by biaxial orientation becomes prominent. Even if crosslinking is caused to some extent in PMMA, the effect of the present invention is similarly attained, and therefore, PMMA in which crosslinking is caused to some extent is included within the scope of the present invention. When the molecular weight is increased, entanglement of the respective molecules is made to effectively act by stretching and a high stretching effect is manifested. The degree of orientation in the sheet may be expressed by the shrinkage stress produced when the sheet is heated, namely by "orientation release stress" (ORS).

Figure 2:
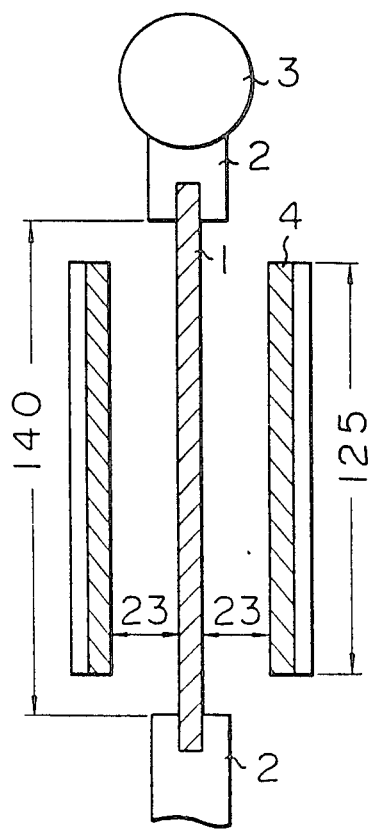
FIG. 2 is a diagram showing an apparatus for measuring the ORS of a biaxially oriented PMMA sheet.

The ORS of the sheet is measured by an apparatus shown in FIG. 2. The size of a specimen and the heating method are as described below, and other measurement conditions are as specified in ASTM D-1504. Referring to FIG. 2, a biaxially oriented sheet 1 is cut into a specimen having a length of 220 mm and a width of 15 mm, and the specimen is fixed by two fixing members 2 so that the length between the fixing members is 140 mm.

Figure 3:
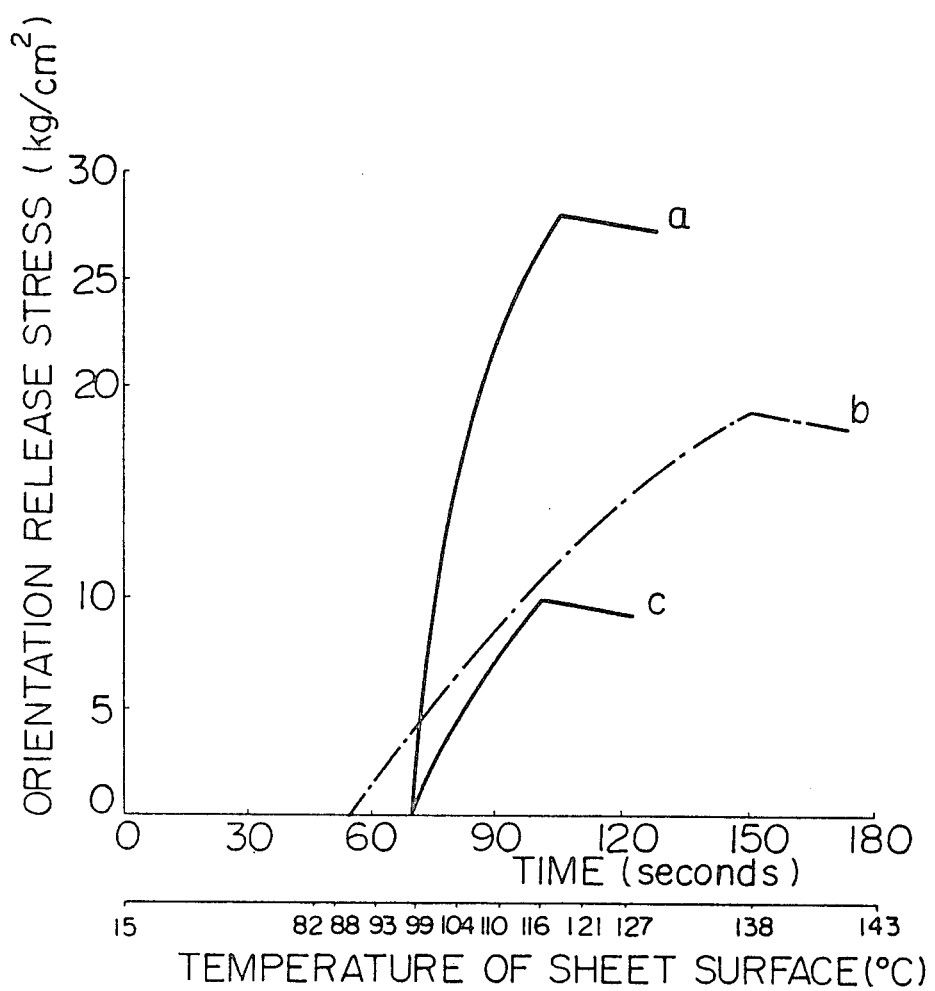
FIG. 3 is an ORS curve of a biaxially oriented PMMA sheet.

Two far infrared ray heaters 4 of 300 W having a length of 125 mm and a width of 65 mm emitting mainly rays having a wavelength of 3 to 7 μm (heating element density=3.7 W/cm²) are located at a position 23 mm apart from the specimen 1 and the surface temperature of the heaters is set at about 300° C. and the sheet is heated. ORS produced is measured by a load cell 3. The obtained results are shown in FIG. 3, wherein the three lines signify the following PMMA sheets.

| Line | Weight average molecular weight ($\times 10^4$) | Stretch area ratio |
|---|---|---|
| a | 440 | 4.5 |
| b | 16 | 4.5 |
| c | 440 | 2.25 |

The above-mentioned measurement has a good reproducibility and measurement results are reliable. As is seen from FIG. 3, the temperature of the surface of the sheet rises with the lapse of time, and when the temperature rises to a certain level, ORS is produced. After ORS reaches a maximum value, ORS is reduced or the sheet breaks. A copolymer composed mainly of MMA has a low softening point and ORS is produced at a relatively low temperature. The higher the stretch ratio, the larger the ORS.

Figure 4:
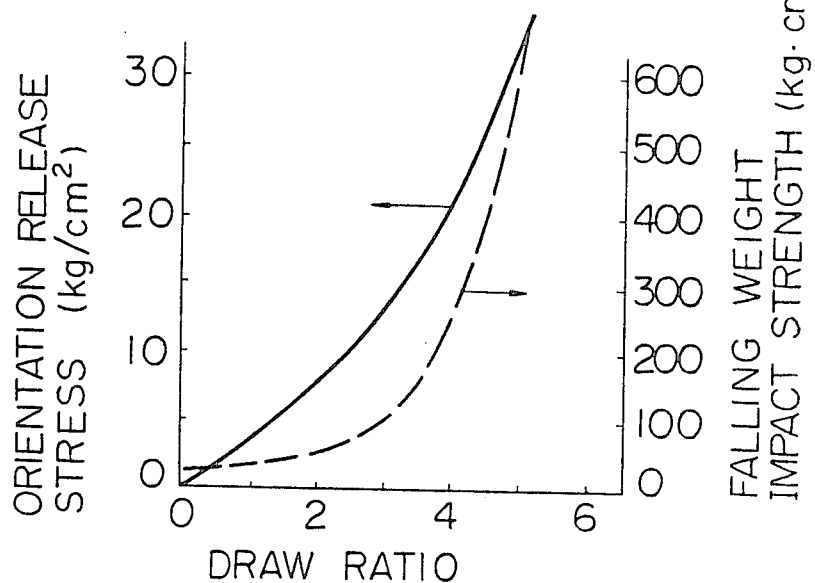
FIG. 4 is a graph illustrating the relation among the stretch ratio, ORS and falling weight impact strength.
Figure 5:
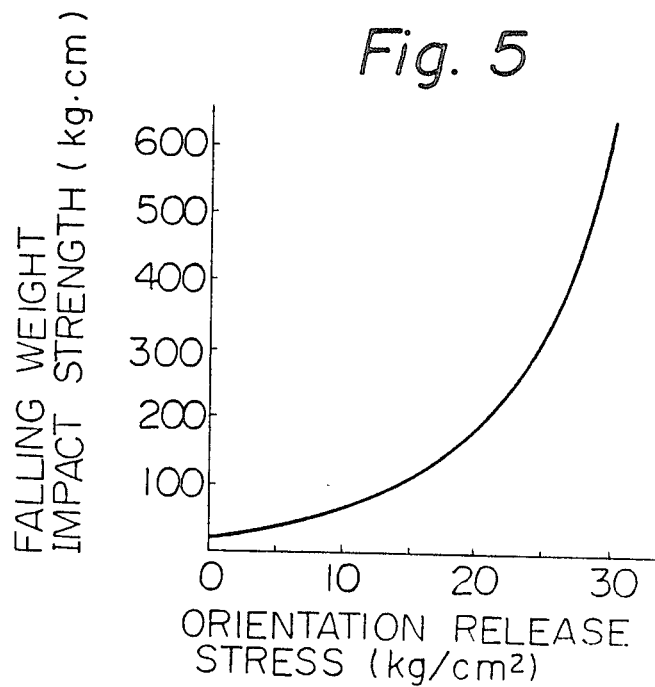
FIG. 5 is a graph illustrating the relation between the ORS and falling weight impact strength.

With respect to PMMA having a weight average molecular weight of 4,400,000, the maximum value of ORS is measured, and its relations to the stretch ratio and the impact strength are determined to obtain results shown in FIGS. 4 and 5. As shown in FIG. 4, increase of the stretch ratio results in an increase of the ORS and impact strength. The impact strength abruptly increases at a stretch ratio of about 3 to about 3.5, and the impact strength is drastically enhanced when the stretch ratio is about 4 or higher. From FIG. 5 illustrating the relation between the ORS and impact strength, it is seen that the impact strength is abruptly increased when the ORS is about 20 kg/cm² or larger.

The above-mentioned improved compression sheet-forming method which is advantageously applied to the production of the acrylic sheet of the present invention will now be described in detail with reference to the drawings.

Figure 7:
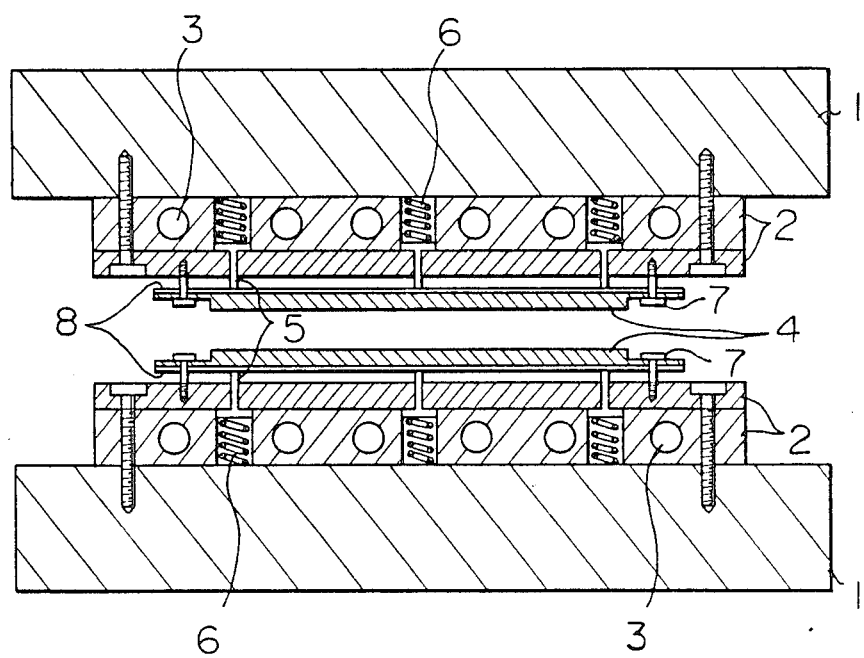
FIG. 7 is a diagram showing the section of a compression sheet-forming apparatus for use in carrying out the sheet-forming process of the present invention.

Referrring to FIGS. 7 and 8, each cooling die plate 2 is secured to a die plate 1 of a compression press. A cooling medium hole 3 is formed on the cooling die plate 2 so that the cooling die plate 2 is always cooled by a cooling medium. A mold plate 4 is attached to the cooling die plate 2. In the state where no compressive force is applied to the die plate 1 and the mold plate 4 is opened, the mold plate 4 is held in non-contact with the cooling die plate 2 by a pin 5 pressed by a pressing spring 6 attached to the cooling die plate 2. In order to bring about this non-contact state at a predetermined distance, a bolt 7 is provided and held in the mold plate 4 through a washer ring or the like having a good heat-insulating property placed between the bolt 7 and the mold plate 4. A thin heat-insulating layer 8 is formed on the back side of the mold plate 4 so that when the mold plate 4 is brought into contact with the cooling die plate 2, the rate of cooling the mold plate 4 can be adjusted.

Figure 8A:
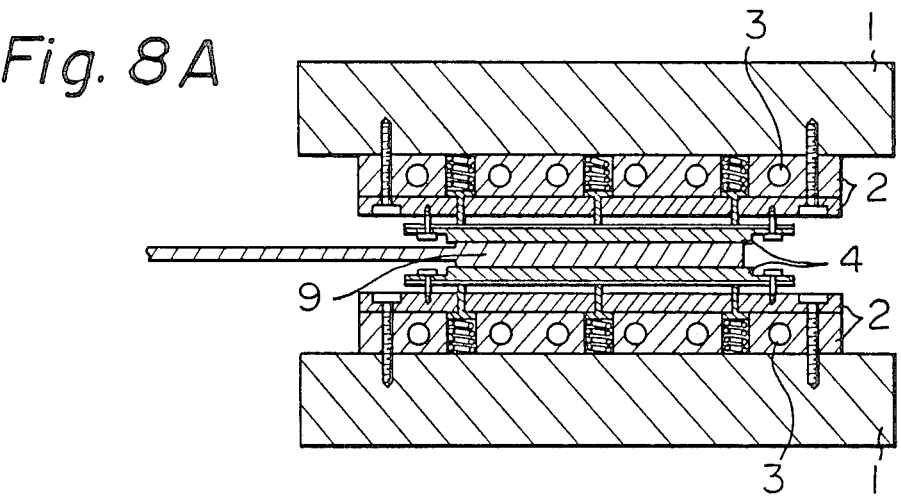
FIGS. 8A–8C is a diagram showing the steps of forming a biaxially oriented PMMA sheet according to the method of the present invention using the apparatus shown in FIG. 7.
Figure 8B:
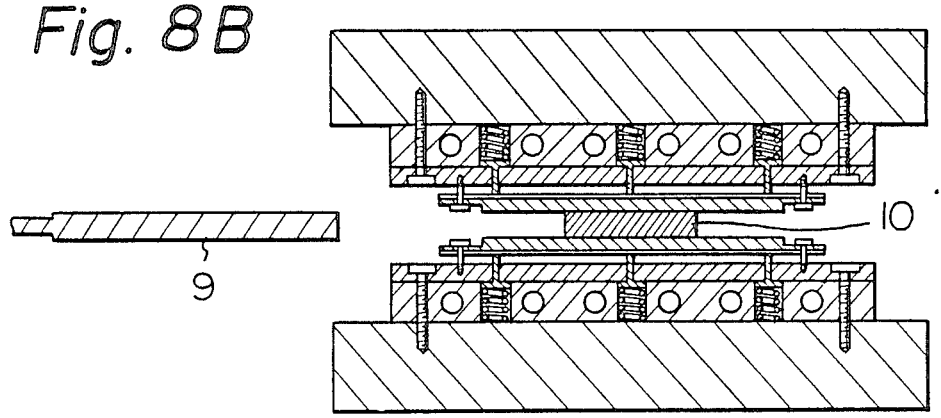
Figure 8C:
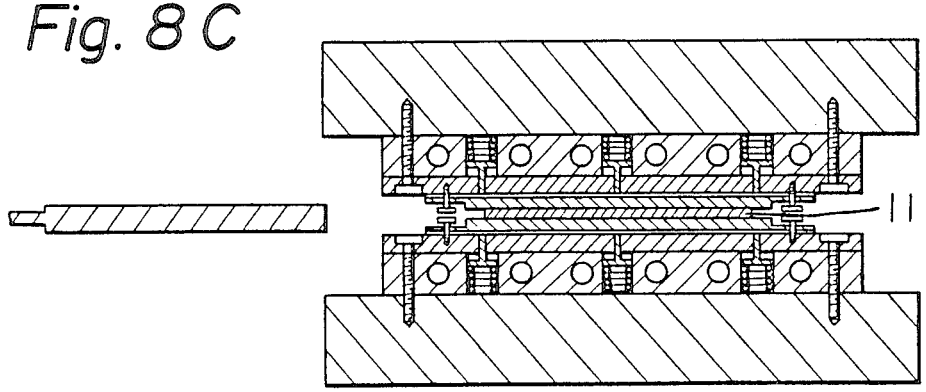

The steps of the sheet-forming operation using the compression sheet-forming apparatus shown in FIG. 7 are illustrated in FIGS. 8A, 8B, and 8C.

Referring to FIG. 8A, a heater 9 is inserted between the mold plates 4 to heat the mold plates 4. In this stage, each mold plate 4 is held in non-contact with the cooling die plate 2. Accordingly, the mold plates 4 are promptly heated to a predetermined level at a high efficiency.

Then, the heater 9 is taken out, and a lubricant is coated on the confronting surfaces of the heated mold plates 4 and a thick blank 10 of an acrylic resin preliminarily heated at a predetermined temperature is inserted between the mold plates 4 (see FIG. 8B).

Then, a compressive force is applied to the die plates 1 to biaxially orient the acrylic resin blank 10 (see FIG. 8C). On compression, each mold plate 4 is brought into contact with the cooling die plate 2 whereby the mold plate 4 is compressed under cooling. The biaxially oriented acrylic sheet 11 is uniformly cooled at a high efficiency. The time required for compression of a thick blank is ordinarily about 3 to about 15 seconds. It is necessary to adjust the thickness of a heat-insulating member 8 arranged on the back side of the mold plate 4 so that during this compression period, the mold plate 4 is not heated to such an extent as rendering the sheet formation difficult.

As is seen from FIGS. 8A, 8B and 8C, the sheet-forming method advantageously adopted in the present invention is characterized in that the mold plates are held substantially in non-contact with the cooling die plates when the mold plates are heated and the mold plates are held in contact with the cooling die plates at the compression step.

The mold plates 4 may be heated by the heater 9 in the state where the mold plates 4 are kept in contact with the heater 9, or the mold plates 4 may be indirectly heated by an infrared radiation heater. Furthermore, a thin heater may be embedded in each mold plate 4.

When the biaxially oriented acrylic resin sheet of the present invention is formed, uniform heating of the mold plates and uniform cooling thereof are very important. In the state where the mold plates 4 are opened, the mold plates 4 are pushed by the pins 5 to be thereby held in non-contact with the cooling die plates 2. However, the pins 5 are kept in contact with the mold plates 4, and the cooling of the mold plates 4 is caused through these pins 5 and the temperature of the mold plates 4 in the vicinity of the pins 5 is lowered. In order to reduce this lowering of the temperature, it is necessary to reduce the thickness of the pins 5. An apparatus in which this influence of the pins 5 is eliminated is illustrated in FIG. 9.

Figure 9:
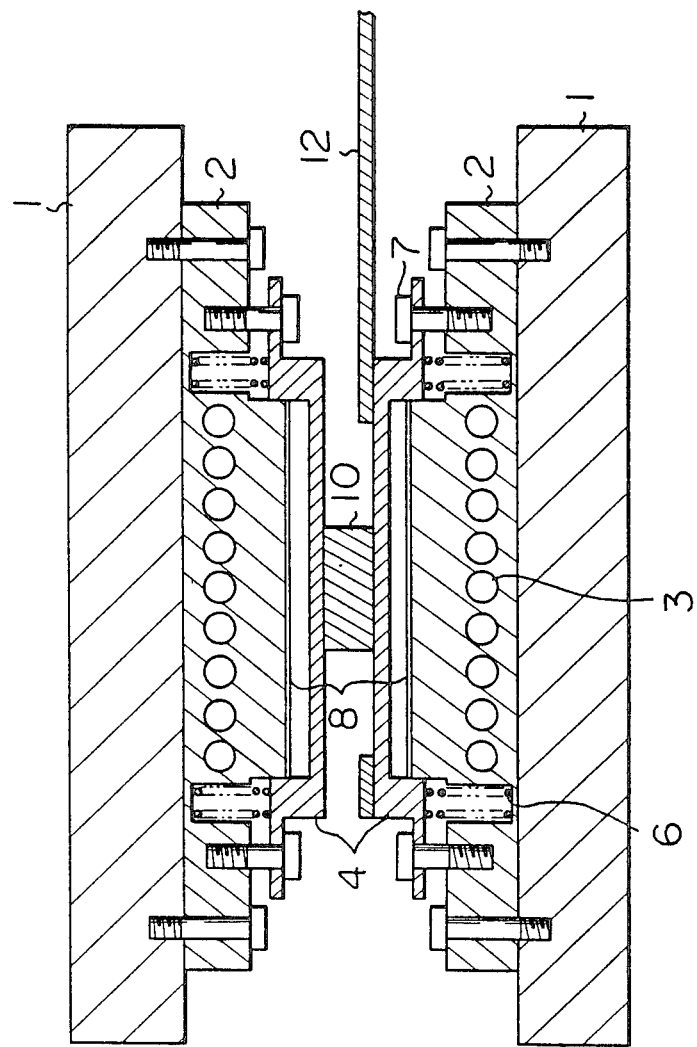
FIG. 9 is a diagram showing the section of another compression forming apparatus for use in carrying out the sheet-forming process of the present invention.

Referring to FIG. 9, push springs 6 are provided on the end portions of each mold plate 4 to separate the mold plate 4 from the cooling die plate 2. There is no heat-transmitting pin or spring in the cavity portion of the mold plates 4. Accordingly, uniform heating and uniform cooling of the mold plates 4 can be accomplished. When the thick resin blank 10 is thus compressed and biaxially oriented, the resin blank 10 fills the mold cavity defined by the mold plates 4 and a frame plate 12. When the pressed resin blank 10 is brought into contact with the frame plate 12, the resin is cooled and solidified. The solidified biaxially oriented sheet can be taken out together with the frame plate 12 from the mold plates 4.

The contact and non-contact of the mold plates with the die plates or cooling plates are repeated in the above-mentioned manner, whereby rapid heating and rapid cooling can be accomplished at a high energy efficiency while reducing the energy loss.

Instead of the above-mentioned springs, actuators may be used for separating the mold plates from the cooling die plates. For example, hydraulic cylinders or pneumatic cylinders can be used.

The above-mentioned compression sheet-forming method is characterized in that when the mold plates are opened, the mold plates are held in non-contact with the die plates or the cooling die plates. As is seen from the drawings, in the state where the mold plates are opened, the mold plates are contacted with only minor parts of the cooling die plates through the springs or bolts. Thus, this state can be regarded as a substantially non-contact state.

The sheet-forming method and apparatus explained with reference to FIGS. 7 through 9 can be applied to the sheet-formation of thermoplastic resins other than acrylic resins. For example, non-crystalline resins such as polystyrene, styrene/acrylonitrile copolymers, ABS resins, polyvinyl chloride, and polycarbonate can advantageously be used. If the sheet-forming conditions are appropriately adjusted, crystalline resins, for example, polyolefins such as polypropylene and polyethylene, polyethylene terephthalate, nylons, and polyoxymethylene can also be used.

The above-mentioned sheet-forming method of the present invention, in which the sheet formation is performed in the state where mold plates are heated, and then the formed sheet is taken out after cooling the mold plates, can precisely reproduce the surface of the mold plates. Therefore, this method can be applied to other molding processes. For example, when formation of a molded article having a mirror-smooth surface is desired by injection molding of a resin mixed with a reinforcing material such as a glass fiber or when precise reproduction of a fine convexity-concavity pattern formed on the surface of the mold plates is desired, the above-mentioned method can advantageously be adopted.

The surfaces of the biaxially oriented sheet formed according to the above-mentioned method of the present invention are not mirror-smooth because of the presence of the lubricant and other additives. However, if the lubricant is removed from this sheet and the sheet is subjected to a glazing compressing using a mold having smooth surfaces, a sheet having smooth surfaces can be obtained. This glazing compression is carried out at a temperature close to Tg, preferably at a temperature in the range of from Tg to (Tg +15° C.), whereby a mirror-smooth surface can be provided while retaining the biaxial orientation. The glazing compression can be performed by using, for example, the apparatus shown in FIGS. 7 and 8A, 8B and 8C. Referring to FIGS. 7 and 8A, 8B and 8C, tempered glass plates having a mirror-smooth surface are used as the mold plates 4 and an infrared radiation heater is used as the heater 9. The mold plates 4 are heated by the infrared radiation heater 9 in the non-contact state. The speed of cooling the mold plates is adjusted by using a thick heat-insulating member 8. The preheated biaxially oriented sheet is sandwiched between the tempered glass mold plates heated above Tg and then the mold plates are cooled under compression, whereby a sheet having good mirror-smooth surfaces can be obtained.

The glazing compression can be followed by an aging treatment. More specifically, the glazing compression is carried out at a temperature of Tg to (Tg+15° C.) for a short time, and successively, the compression is continued while the temperature is lowered to a level of (Tg−15° C.) to Tg to effect aging.

The biaxially oriented PMMA sheet which has thus been subjected to the glazing compression and aging treatment has a smooth surface and is suitable as a glazing material. The surface smoothness can be determined according to the following method.

The sheet is rotated in parallel to the plane and semiconductor laser is applied on a circle having a diameter of 280 mm on the rotated sheet and the number of protrusions and depressions on the periphery of said circle is counted.

The biaxially oriented PMMA sheet of the present invention which has been subjected to the glazing compression and aging treatment is characterized in that it has such a surface smoothness that the number of means (protrusion-to-depression) having an amplitude of at least 0.02 mm, which are present on any circle having a diameter of 280 mm on the surface of the sheet, is less than 5. In the sheet which has not been subjected to the glazing compression and aging treatment, the number of waves having an amplitude of at least 0.02 mm is apparently 5 or more, and fine undulations are observed on the surface. Accordingly, it is preferred that the sheet of the present invention be subjected to the above-mentioned glazing compression and aging treatment.

The present invention will be further described by the following examples.

EXAMPLES

The molecular weight referred to in this example was one calculated according to the formula: $[\eta]=KM_w^a$ ($K \times 10^5 = 4.3$ dl/g; $a=0.8$; $[\eta]$ was determined on a chloroform solution).

A plate having a size of 25 cm×25 cm×2 cm (thickness), which was composed of a methyl methacrylate homopolymer having a molecular weight of 4,700,000 and formed by the cell cast method, was used as a blank.

The sheet-forming operation was carried out according to the process shown in FIGS. 8A, 8B, and 8C by using the compression sheet-forming apparatus shown in FIG. 7. Mold plates 4 having a coarse surface of about 20 μm were heated at 150° C. by a heater 9 (see FIG. 8A). The acrylic resin blank 10 was gripped between iron plates heated at 170° C. and was heated for 10 minutes. A good lubricant was uniformly coated on the surface of each mold plate 4, and then, the heated acrylic resin blank was sandwiched between the mold plates 4 (see FIG. 8B). The blank was compressed under a high compressive force of 500 kg/cm² to biaxially orient the blank at a stretch area ratio of 5 (see Fig. AC), whereby a biaxially oriented sheet having a thickness of 4 mm was obtained.

In the same manner as described above, methyl methacrylate homopolymers having molecular weights of 4,400,000, 4,000,000, and 1,100,000, and a methyl methacrylate/methyl acrylate copolymer having a molecular weight of 160,000 (the content of methyl acrylate as the comonomer was 5% by weight) were compression-molded at a stretch ratio shown below to obtain biaxially oriented sheets.

Each of the so-obtained sheets was washed and subjected to the glazing compression and aging treatment in the state where the sheet was gripped between tempered glass sheets having a mirror-smooth surface. More specifically, each sheet was maintained at (Tg+10°) for five minutes and then at (Tg−10° C.) for 24 hours. Thus, biaxially oriented smooth sheets were obtained. The sheets had such a smooth surface that the number of waves having an amplitude of at least 0.02 mm, which were present on any circle having a diameter of 280 mm on the sheet surface, was less than 5.

With respect to each sheet, the ORS and falling weight impact strength were measured. The results are shown in Table 1.

TABLE 1

| Run Weight No. | Molecular Weight (× 10⁴) | Stretch Ratio | ORS (kg/cm²) | Falling Impact Strength (kg · cm) |
|---|---|---|---|---|
| 1 | 470 | 5 | 30 | >400 |
| 2 | 440 | 3.5 | 22 | 200 |
| 3* | 400 | 2.5 | 12 | 60 |
| 4 | 110 | 4 | 22 | 200 |
| 5* | 110 | 2.5 | 11 | 60 |
| 6* | 16 | 5 | 18 | 100 |
| 7* | 400 | Not stretched | 0 | 20 |

*Comparative examples

Each of the biaxially oriented sheets according to the present invention (the sheets obtained in Runs Nos. 1, 2, and 4) was remarkably tough.

The properties of the sheets of the MMA homopolymer having a molecular weight of 4,700,000, one being stretched at a stretch ratio of 5 and the other being not stretched, the sheet of the MMA copolymer having a molecular weight of 160,000, which was stretched at a stretch ratio of 5, and an unstretched sheet of polycarbonate derived from bisphenol A, are shown in Table 2.

The above-mentioned stretched sheets of the MMA homopolymer and the MMA copolymer were heated at various temperatures for 24 hours to determine the shrinkages of the sheets. The obtained results are shown in FIG. 10.

Figure 10:
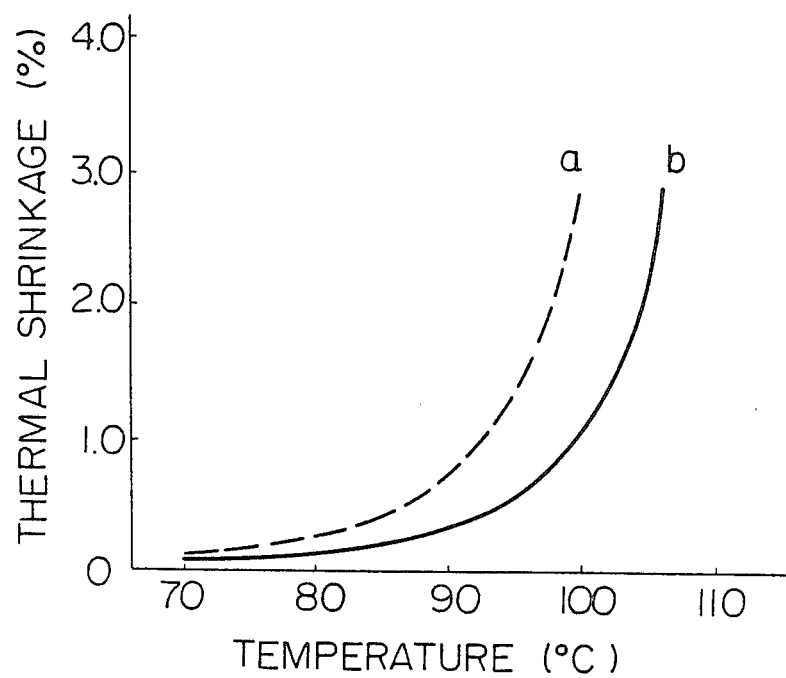
FIG. 10 is a graph showing the relation between the heating temperature and thermal shrinkage of a PMMA sheet according to the present invention.

From the results shown in Table 2 and FIG. 10, it is seen that the sheet of PMMA having a molecular weight of 4,700,000, which was stretched at a stretch ratio of 5, was excellent in the mechanical strength characteristics and thermal shrinkage, that is, heat resistance. This sheet was superior as a glazing material to the polycarbonate sheet.

TABLE 2

|  | MMA Homopolymer | MMA Homopolymer | MMA Copolymer | Polycarbonate |
|---|---|---|---|---|
| Molecular Weight | 4,700,000 | 4,700,000 | 160,000 | — |
| Stretch Ratio | 1 (unstretched) | 5 | 5 | 1 (unstretched) |
| Specific Gravity (ASTM D-792) | 1.19 | 1.19 | 1.19 | 1.2 |

TABLE 2-continued

|  | MMA Homopolymer | MMA Homopolymer | MMA Copolymer | Polycarbonate |
|---|---|---|---|---|
| Water Absorption (%, ASTM-570) | 0.3 | 0.3 | 0.3 | 0.18 |
| Light Transmission (%, ASTM D-1003) | 93 | 93 | 93 | 87 |
| Refractive Index (ASTM D-542) | 1.49 | 1.49 | 1.49 | 1.586 |
| Tensile Strength (kg/cm$^2$, ASTM D-638) | 670 | 770 | 660 | 600 |
| Elongation (%, ASTM D-638) | 3 | 19 | 16 | 100 |
| Flexural Modulus (kg/cm$^2$, ASTM D-790) | 35,000 | 35,000 | 35,000 | 24,000 |
| Izod Impact Strength (notched) (kg · cm/cm, ASTM-256) | 1.4 | 3.5 | 3.0 | 70 |
| Rockwell Hardness (M scale, ASTM D-783) | 105 | 105 | 98 | 80 |
| Weatherability | Good | Good | Good | Poor |

What is claimed is:

1. A compression forming apparatus for forming a thermoplastic resin sheet of the type wherein a thermoplastic resin blank is compressed between a pair of heated mold plates, the mold plates are cooled to solidify the formed sheet, and the sheet is taken out from the mold plates, said apparatus comprising a pair of cooling die plates, a pair of mold plates which are attached to the cooling die plates, means for clamping the mold plates together, a plate-form heater operable to heat the mold plates when the heater is sandwiched between the pair of the mold plates, said plate-form heater being removable from between the pair of mold plates, and means for holding the mold plates in contact with the cooling die plates when the mold plates are clamped together and in non-contact with the cooling die plates when the mold plates are opened.

2. A compression forming apparatus according to claim 1, wherein said means for holding are springs provided in the end portions of the respective mold plates.